(12) United States Patent
Streid et al.

(10) Patent No.: US 10,389,988 B2
(45) Date of Patent: Aug. 20, 2019

(54) HIGH EFFICIENCY MOTION BLUR REDUCTION AND INFRARED PROJECTION

(71) Applicant: The Boeing Company, Chicago, IL (US)

(72) Inventors: Harold R. Streid, Ladue, MO (US); Carl J. Vorst, Saint Ann, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/818,061

(22) Filed: Aug. 4, 2015

(65) Prior Publication Data
US 2016/0073078 A1    Mar. 10, 2016

Related U.S. Application Data

(63) Continuation-in-part of application No. 14/478,160, filed on Sep. 5, 2014.

(51) Int. Cl.
| | |
|---|---|
| *H04N 5/64* | (2006.01) |
| *H04N 9/31* | (2006.01) |
| *G02B 26/04* | (2006.01) |
| *G03B 21/14* | (2006.01) |
| *G03B 21/26* | (2006.01) |

(52) U.S. Cl.
CPC .......... *H04N 9/3179* (2013.01); *G02B 26/04* (2013.01); *G03B 21/14* (2013.01); *H04N 9/3141* (2013.01); *H04N 9/3197* (2013.01); *G03B 21/26* (2013.01)

(58) Field of Classification Search
CPC ...... H04N 9/3179; H04N 9/65; H04N 9/3141; H04N 9/3197; G02B 26/04
USPC .......... 348/744, 745; 353/88; 352/134, 135, 352/204, 199, 198, 205, 209, 212, 203, 352/164, 165
See application file for complete search history.

(56) References Cited

U.S. PATENT DOCUMENTS

| | | | |
|---|---|---|---|
| 8,194,193 B2 | 6/2012 | Streid et al. | |
| 8,537,977 B2 | 9/2013 | Park et al. | |
| 8,845,107 B1 * | 9/2014 | Coley | G06T 19/20 353/28 |
| 9,134,593 B1 * | 9/2015 | Worley, III | G03B 21/147 |
| 9,811,267 B1 * | 11/2017 | Yang | G06F 3/061 |
| 2001/0028341 A1 * | 10/2001 | Kitazawa | G06F 3/0425 345/156 |

(Continued)

OTHER PUBLICATIONS

Dr. H. Burggraf, et al.: "High Level Vis-IR Stimulated NVG Training", IMAGE 2009 Conference, St. Louis, Missouri, Jul. 2009.

(Continued)

*Primary Examiner* — Jefferey F Harold
*Assistant Examiner* — Omer Khalid
(74) *Attorney, Agent, or Firm* — Patterson + Sheridan, LLP (57) ABSTRACT

A video projector, a shutter mechanism for a video projector, and a method for providing a visible image and an infrared image. The shutter includes first regions that filter out visible light and second regions that filter out infrared light. The second regions are arranged between adjacent first regions. The shutter can be synchronized with an image modulator that alternately outputs visible light images and infrared images. The infrared images can be viewed using night vision goggles, allowing night vision goggle users to train in a simulated environment.

19 Claims, 7 Drawing Sheets

(56) References Cited

U.S. PATENT DOCUMENTS

| | | | | |
|---|---|---|---|---|
| 2004/0012849 A1* | 1/2004 | Cruz-Uribe | .......... | G02B 26/026 359/449 |
| 2005/0094109 A1* | 5/2005 | Sun | ........................ | G03B 21/60 353/79 |
| 2006/0192755 A1* | 8/2006 | Blythe | .................. | G06F 3/0421 345/158 |
| 2006/0291014 A1* | 12/2006 | Hirata | .................... | G03B 21/14 358/504 |
| 2007/0139519 A1* | 6/2007 | DeCusatis | .............. | G02B 27/26 348/58 |
| 2012/0315603 A1* | 12/2012 | Streid | ...................... | G09B 9/36 434/37 |

OTHER PUBLICATIONS

Koebel, Alen, LED Illumination for Simulation and Training: A whitepaper, Christie Digital Systems USA, Inc., pp. 1-4, Dec. 2008, Christie, Cypress, United States.

Christie, Christie Matrix Series: Civil aviation and transportation Education and training Military and defense, 2013, 7 pages, Christie, Cypress, United States.

* cited by examiner

HIGH EFFICIENCY MOTION BLUR REDUCTION AND INFRARED PROJECTION

CROSS-REFERENCE TO RELATED APPLICATIONS

This application is a continuation-in-part of co-pending U.S. patent application Ser. No. 14/478,160, filed Sep. 5, 2014. The aforementioned related patent application is herein incorporated by reference in its entirety.

FIELD

The aspects described herein relate to shutters for video projectors, and more specifically, to shutters that reduce motion blur while improving perceived image brightness and/or offering color correction, and to shutters that alternately provide visible light and infrared light images.

BACKGROUND

A video can be a display of sequential static images shown in rapid succession such that the human brain perceives the changes from one static image to the next as continuous movement. For example, motion pictures (i.e., movies) are often displayed at twenty four or forty eight frames per second. Video for television is often displayed at fifty frames per second, sixty frames per second, or multiples thereof.

Video projectors project a light source onto an imaging circuit (e.g., a liquid crystal display (LCD), liquid crystal on silicon (LCoS), or Digital Light Projection (DLP®)) to form an image and then project the image onto a surface (e.g., a display screen). Video projectors often use a shutter mechanism to shorten the time that individual sequential static images are presented to a viewer's eyes.

The shutter can also reduce motion blur perceived by a viewer. If a projected image of an object is moving across a projected image field (e.g., a baseball traveling through the air or an aircraft flying across the screen), a viewer's eye will attempt to smoothly track the perceived moving object. However, as described above, the projected image of the moving object is actually a sequence of static images. Thus, when the shutter is open during display of any one particular static image, the object is not moving. Consequently, during the brief period of time that any particular static image is displayed, the viewer's eye is moving to track the object while the object is static. As a result, the projected image is "smeared" across the viewer's retina such that the viewer perceives a blurry image.

To counteract image blur, the amount of time that the shutter is open can be decreased. By decreasing the open shutter time (i.e., the duty cycle), each static image is displayed for a shorter period of time, which reduces the "smearing" of the image on the retina as the viewer's eye attempts to track a moving object. However, decreasing the duty cycle also decreases the brightness of the displayed image.

Additionally, video images are often displayed according to a particular color specification. The specification assumes that a light output from a projector has a particular color temperature (i.e., white point) when the projector responds to the full scale input for each of the input primary colors (usually red, green, and blue). However, the projector may not output the correct color temperature when outputting at full brightness. The color temperature may be corrected by attenuating one or more of the primary colors from the light output, but such correction decreases the brightness of the displayed image.

Also, in certain circumstances, night vision goggle users want to simulate operations while using the night vision goggles. For example, certain aircraft operators (e.g., military and emergency medical services helicopter pilots) sometimes fly with night vision goggles. Current simulators do not allow such operators to use their actual night vision goggles because the displayed images do not provide infrared images that are detectable by such goggles.

SUMMARY

Aspects of a video projector include a light source operable to output visible light and near infrared (IR) light. The video projector also includes an imaging circuit arranged in a path of light from the light source. The imaging circuit is operable to selectively output a visible light image and an IR light image. The video projector also includes a shutter arranged relative to the path of light. The shutter includes a first region and a second region. The first region is substantially transmissive to visible light and substantially non-transmissive to IR light. The second region is substantially transmissive to IR light and substantially non-transmissive to visible light. The video projector also includes a controller communicatively coupled to the shutter and configured to selectively position the first region and the second region in the path of light. Operation of the shutter is synchronized with operation of the imaging circuit such that the first region is in the path of light during a first period of time when the imaging circuit is outputting a visible light image and the second region is in the path of light during a second period of time when the imaging circuit is outputting an IR light image.

According to at least one aspect, a shutter for a video projector includes a rotatable disk. The rotatable disk includes a plurality of first regions and a plurality of second regions. The first regions of the plurality of first regions are spaced around the rotatable disk. A second region of the plurality of second regions is arranged between adjacent first portions. The first region is transmissive to visible light and the second region is transmissive to IR light.

According to at least one aspect, a method for projecting a video image includes projecting a digital video image in a path of light that includes a sequence of digital images. The path of light includes light in the visible spectrum and light in the near infrared (IR) spectrum. The digital images of the sequence of images are displayed for a predefined interval of time. The sequence of images alternate between visible light images and (IR) images. The method also includes filtering light in the IR spectrum from the path of light for a first time interval during which a visible light image is provided. The method also includes filtering light in the visible spectrum from the path of light for a second time interval during which an IR light image is provided.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1A:
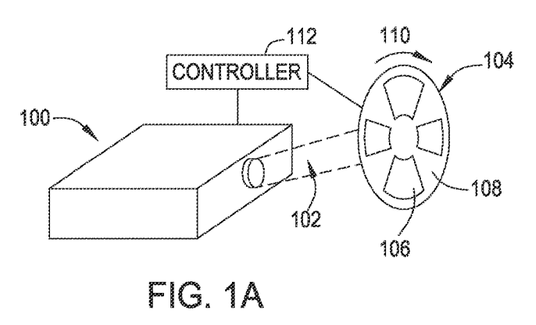
FIG. 1A is a depiction of a video projector with a shutter wheel arranged in a path of light projected by the projector.

Referring to FIG. 1A, a projector 100 can output a path of light 102 that can display an image on a screen or the like. The projector 100 can include a shutter wheel 104 arranged relative to the path of light 102. According to one aspect, the shutter wheel 104 can be a rotatable disk that can include 100% transmissive regions 106 (meaning that all light in the path of light 102 passes through) and 0% transmissive regions 108 (meaning that all light in the path of light 102 is blocked from passing through). A person having ordinary skill in the art would understand that no material is 100% transmissive. Even air and optically pure glass will scatter a small amount of light passing through it. However, in a projector application, the amount of light scattered in such a manner is insignificant. Thus, as used herein, the term 100% transmissive ignores the small amount of light that is lost due to travel through air, transparent glass, and the like. The shutter wheel 104 can be made of an opaque material, such as metal or plastic, wherein the 100% transmissive regions are apertures or windows in the material. In various other aspects, the shutter wheel 104 can be made of a translucent material and can include a layer arranged thereon that is opaque. The 100% transmissive regions can be apertures or windows in the translucent material or can be regions of the translucent material that do not include the opaque layer. The shutter wheel 104 can be coated with an anti-reflective coating so that when the path of light 102 impinges on the material in the 0% transmissive regions, the light is not scattered or is minimally scattered.

For illustration purposes, the shutter wheel 104 is shown outside of the projector 100. However, the shutter wheel can be located inside of the projector 100 in a manner that the 100% transmissive regions 106 and 0% transmissive regions 108 can be arranged in the path of light 102. For example, the shutter wheel can be located between a light source and imaging chip(s) in the projector 100. As another example, the shutter can be located between imaging chip(s) and a lens of the projector 100. There can be other beam steering optics that are not shown.

As indicated by arrow 110, the shutter wheel 104 can be rotated to selectively arrange 100% transmissive regions 106 and 0% transmissive regions 108 in the path of light 102. As shown in FIG. 1A, the shutter wheel 104 includes 100% transmissive regions 106 and 0% transmissive regions 108 that have approximately equal dimensions. Thus, when the shutter wheel 104 rotates at a constant speed (indicated by arrow 110), then the shutter wheel is open (i.e., the 100% transmissive region 106 in the path of light) for approximately 50% of the time. This is referred to herein as a shutter with a 50% duty cycle. By contrast, if a shutter wheel has 100% transmissive regions that are approximately one third of the size of the 0% transmissive regions, then the shutter would be open approximately 25% of the time. This is referred to herein as a shutter with a 25% duty cycle. Similarly, if a shutter wheel has 100% transmissive regions that are approximately three times the size of the 0% transmissive regions, then the shutter would be open approximately 75% of the time. This is referred to herein as a shutter with a 75% duty cycle. The shutter wheel can be rotated by a controller 112 that can control the speed of rotation of the shutter and synchronize the shutter wheel with the images in the path of light 102.

Figure 1B:
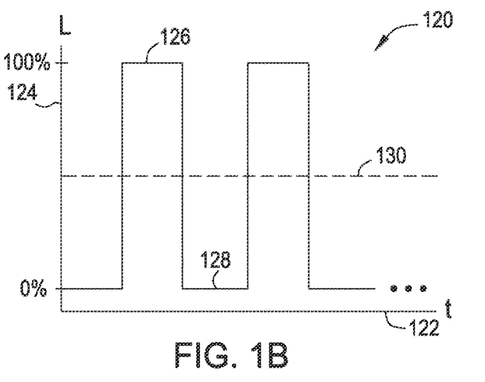
FIG. 1B is a chart illustrating luminance and perceived brightness over time of the projected image of the projector and shutter wheel of FIG. 1A.

FIG. 1B is an exemplary chart 120 of luminance (L) 124 of the path of light 102 over time (t) 122 for the projector 100 of FIG. 1A. For example, the luminance L 124 may be measured immediately downstream from the shutter wheel 104. The chart 120 indicates that during a time interval when the shutter wheel is open (i.e., when a 100% transmissive region 106 is in the path of light 102), the luminance is 100%, meaning that all or nearly all of the light from the path of light 102 passes through the 100% transmissive region 106. By contrast, during a time interval when the shutter wheel 104 is closed (i.e., when a 0% transmissive region 108 is in the path of light 102), the luminance is at 0%, meaning that none of the light from the path of light 102 passes through the 0% transmissive region 106. Since the shutter rapidly opens and closes, the human eye and brain generally does not perceive the distinct periods of 100% luminance 126 and 0% luminance 128. Rather, the human eye and brain merge the 100% luminance 126 and the 0% luminance into a perceived luminance 130 that is between the 100% luminance 126 and the 0% luminance 128. For purposes of illustration and comparison herein, perceived luminance by the human eye and brain is assumed to be a time-weighted average of the maximum luminance and the minimum luminance according to the equation: Perceived Luminance=(Max. Luminance*t1+Min. Luminance*t2)/ (t1+t2), wherein t1 and t2 are times at which the luminance is at its maximum and its minimum, respectively. For example, the times t1 and t2 can be provided as fractions during a cycle of maximum luminance and minimum luminance. For a shutter with a 50% duty cycle, t1 and t2 can each equal 0.5. For a shutter with a 25% duty cycle, t1 can equal 0.25 and t2 can equal 0.75.

FIG. 1B illustrates a shutter wheel 104 with a 50% duty cycle because the periods of 100% luminance 126 are equal to the periods of 0% luminance. Thus, t1 and t2 are equal and the perceived luminance 130 may be approximately 50% luminance.

Figure 1C:
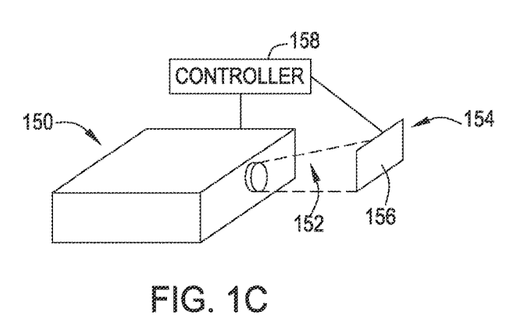
FIG. 1C is a depiction of a video projector with a liquid crystal shutter arranged in a path of light projected by the projector.
Figure 1D:
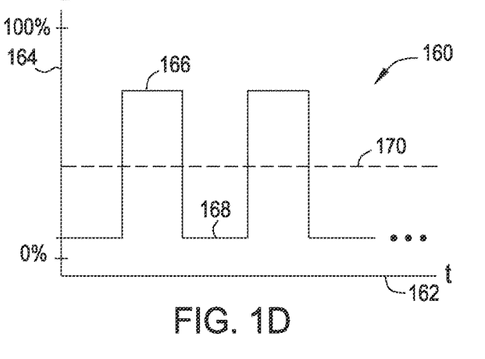
FIG. 1D is a chart illustrating luminance and perceived brightness over time of the projected image of the projector and liquid crystal shutter of FIG. 1C.

FIG. 1C illustrates a video projector 150 with a liquid crystal shutter 154 arranged in a path of light 152 of the video projector 150. The liquid crystal shutter 154 includes a liquid crystal window 156 through which the path of light 152 passes. As an example, the liquid crystal window 156 may be capable of varying between a mostly-transmissive state (e.g., between 80% and 90% transmissive) and barely-transmissive (e.g., between 5% and 10% transmissive). A controller 158 can be in communication with the liquid crystal shutter 154 to synchronize the transitions between the mostly-transmissive state and the barely-transmissive state with images in the path of light 152. An example of the variation between the transmissive states using the liquid crystal shutter 154 of FIG. 1C is show in FIG. 1D. FIG. 1D is a chart 160 showing luminance (L) 164 over time (t) 162 with a maximum luminance 166 less than the 100% luminance 126 shown in FIG. 1B. For example, the maximum luminance may be 85% luminance. Also, the minimum luminance 168 is greater than the 0% luminance 128 shown in FIG. 1B. For example, the minimum luminance 168 may be 5% luminance. As a result, the perceived luminance 170 may be 45% for the liquid crystal shutter 154, which may be lower than the perceived luminance 130 for the shutter wheel 104 shown in FIG. 1A (a perceived brightness of 50% luminance, described above).

Figure 1E:
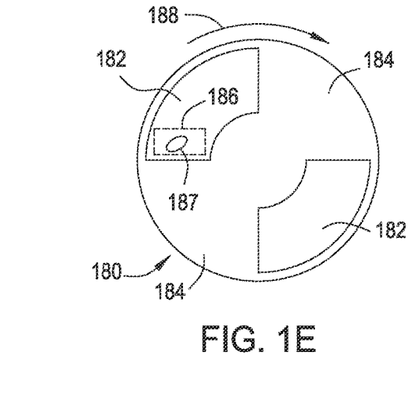
FIG. 1E is a front view depiction of a shutter wheel, such as the shutter wheel shown in FIG. 1A, wherein the shutter has a 50% duty cycle, and wherein a 100% transmissive region of the shutter wheel is aligned with a path of light from the projector.
Figure 1F:
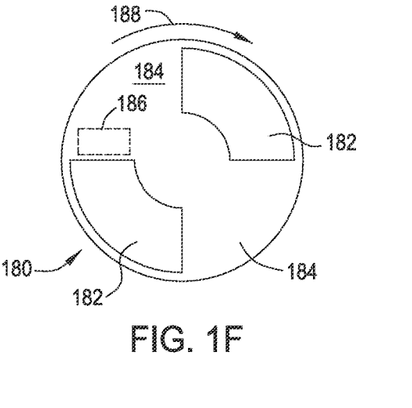
FIG. 1F is a front view of the shutter wheel of FIG. 1E, wherein a 0% transmissive region of the shutter wheel is aligned with the path of light from the projector.
Figure 1G:
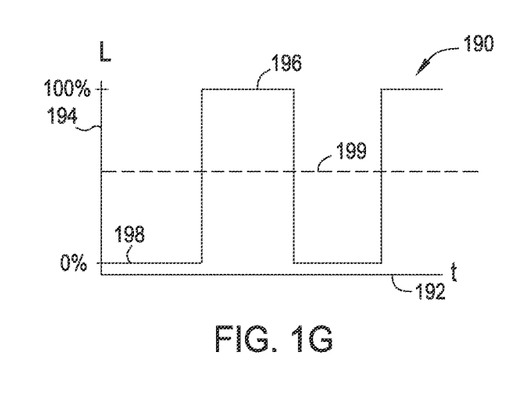
FIG. 1G is a chart illustrating luminance and perceived brightness over time of the projected image of the projector and shutter of FIG. 1E.

FIGS. 1E and 1F illustrate a shutter wheel 180 with two 100% transmissive regions 182 and two 0% transmissive regions 184 arranged around the shutter wheel 180. The 100% transmissive regions 182 and 0% transmissive regions 184 are of equal size, resulting in a shutter with a 50% duty cycle. The shutter wheel 180 can be arranged relative to a path of light 186 from a projector (e.g., projector 100) such that, as the shutter wheel rotates in the direction of arrow 188, the path of light 186 passes selectively through the 100% transmissive regions 182 (i.e., an open shutter) and then the 0% transmissive regions 184 (i.e., a closed shutter). The boundaries of the path of light 186 are illustrated with dashed lines. For illustration purposes, a moving image 187 of an object (e.g., a football flying through the air) in a projected video sequence may be moving relative to the boundaries of the path of light 186. FIG. 1E illustrates the shutter wheel 180 in a rotational position such that the path of light 186 passes through a 100% transmissive region 182, enabling the path of light 186 to pass through (e.g., to be projected on to a projector screen). In FIG. 1F, the shutter wheel 180 has rotated to a position such that the path of light 186 is blocked completely by a 0% transmissive region 184. As shown in FIG. 1F, the shutter wheel 180 has rotated from the position shown in FIG. 1E such that the entirety of the path of light 186, including the image of the moving image 187, is blocked by the 0% transmissive part. Referring now to the chart 190 of luminance (L) 194 over time (t) 195 shown in FIG. 1G, the shutter wheel 180 with a 50% duty cycle shown in FIGS. 1E and 1F may result in a perceived luminance 199 of approximately 50% luminance based on the time-weighted average being used herein for illustration and comparison purposes.

Figure 1H:
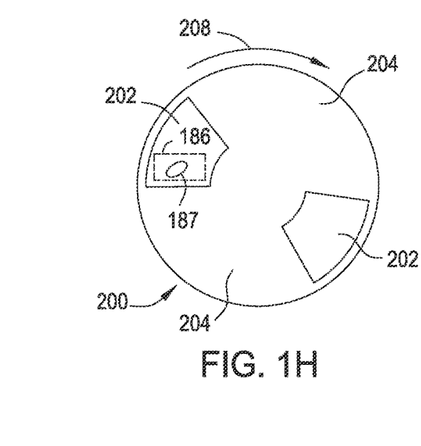
FIG. 1H is a front view depiction of a shutter wheel, such as the shutter wheel shown in FIG. 1A, wherein the shutter has a 25% duty cycle, and wherein a 100% transmissive region of the shutter wheel is aligned with a path of light from the projector.
Figure 1I:
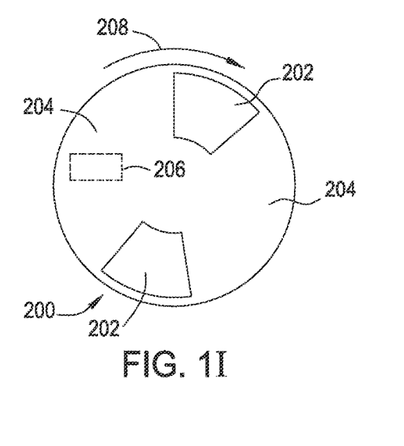
FIG. 1I is a front view of the shutter wheel of FIG. 1H, wherein a 0% transmissive region of the shutter wheel is aligned with the path of light from the projector.
Figure 1J:
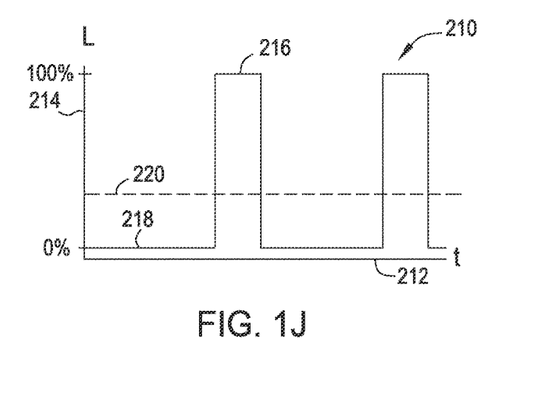
FIG. 1J is a chart illustrating luminance and perceived brightness over time of the projected image of the projector and shutter of FIG. 1H.

FIGS. 1H and 1I illustrate a shutter wheel 200 similar to the shutter wheel 180 shown in FIGS. 1E and 1F, except that the duty cycle has been reduced to 25%. As described above, the duty cycle may be reduced to reduce perceived motion blur of the moving image 187. Thus, the 100% transmissive regions 202 are approximately one third of the size of the 0% transmissive regions 204. As a result, as shown in FIG. 1H, if the shutter wheel 200 is rotated in the direction of arrow 208 at the same rate as shutter wheel 180, then the path of light 186 and the moving image 187 therein will pass through the 100% transmissive regions 202 for a shorter duration. Also, as shown in FIG. 1I, the path of light 186 and the moving image 187 therein will be blocked by the 0% transmissive regions 204 for a longer duration. Referring to the chart 210 of luminance (L) 214 over time (t) 212 shown in FIG. 1J, the shortened duty cycle results in shorter 100% luminance 216 duration and longer 0% luminance 218 duration. As a result, the perceived luminance 220 may be reduced relative to the perceived luminance 199 shown in FIG. 1G. For example, for a 25% duty cycle, the duration of 0% luminance 218 is three times as long as the duration of 100% luminance. Thus, the perceived luminance 220 may decrease to 25% luminance based on the time-weighted average being used herein for illustration and comparison purposes.

Figure 2A:
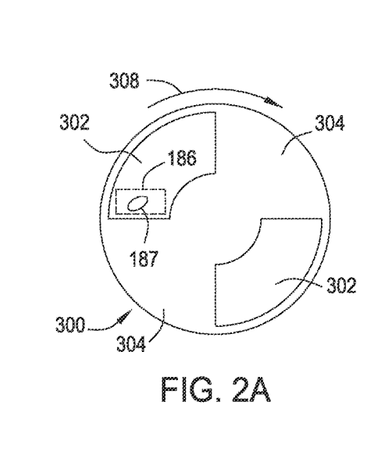
FIG. 2A is a front view depiction of a shutter, wherein the shutter has a 50% duty cycle, and wherein a 100% transmissive region of the shutter wheel is aligned with a path of light from the projector.
Figure 2B:
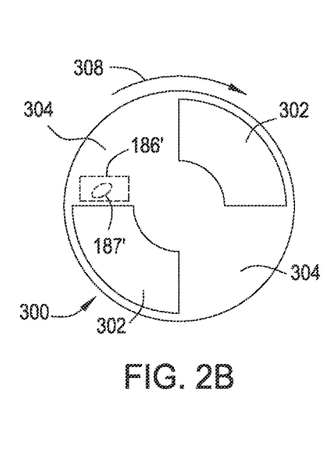
FIG. 2B is a front view of the shutter wheel of FIG. 2A, wherein a partially transmissive region of the shutter wheel is aligned with the path of light from the projector.
Figure 2C:
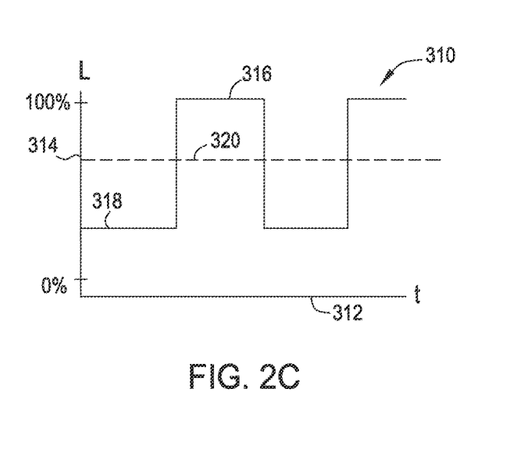
FIG. 2C is a chart illustrating luminance and perceived brightness over time of the projected image of the projector and shutter of FIG. 2A.

FIG. 2A illustrates an aspect of a shutter wheel 300 similar to the shutter wheel 180 with a 50% duty cycle shown in FIGS. 1E and 1F, but that includes 100% transmissive regions 302 and partially transmissive regions 304. The partially transmissive regions 304 filter out some of the path of light 186. The partially transmissive regions 304 are more than 0% transmissive and less than 100% transmissive. For example, the partially transmissive regions 304 may be between 10% transmissive and 90% transmissive. As another example, the partially transmissive regions 304 may be between 20% transmissive and 80% transmissive. As another example the partially transmissive regions 304 may be between 30% transmissive and 70% transmissive. As another example, the partially transmissive regions 304 may be between 40% transmissive and 60% transmissive. In various aspects, the shutter wheel 300 can be formed from a generally transparent material such as a plastic, acrylic, glass, or the like. A film or layer that partially filters light can be applied and/or deposited onto a surface of the transparent. The film or layer can filter out some light that would otherwise pass through the transparent material. Regions of the shutter wheel 300 that include the film or layer can comprise the partially transmissive regions 304 of the shutter wheel 300. The 100% transmissive regions 302 can be formed by omitting the film or layer from portions of the transparent material and/or by forming apertures or windows in the transparent material (i.e., regions void of material). As shown in FIG. 2A, when a 100% transmissive region 302 is arranged in the path of light 186 with the moving image 187 therein, the path of light 186 passes through unimpeded. As shown in FIG. 2B, when a partially transmissive region 304 is arranged in the path of light 186, some of the path of light 186' and moving image 187' of the moving object passes through the partially transmissive region 304 for display on a projection screen, for example. Referring to the chart 310 of luminance (L) 314 over time (t) 312 in FIG. 2C, the path of light 186 provides 100% luminance 316 when passing through the 100% transmissive regions 302 and partial luminance 318 when passing through partially transmissive regions 304. The resulting perceived luminance 320 may be higher than the perceived luminance 199 for the shutter wheel 180 with 0% transmissive regions 184. For example, if the partially transmissive regions 304 are 50% transmissive for a 50% duty cycle shutter wheel 180, then the perceived luminance 320 may be 75% luminance based on the time-weight average being used herein for illustration and comparison purposes.

Figure 2D:
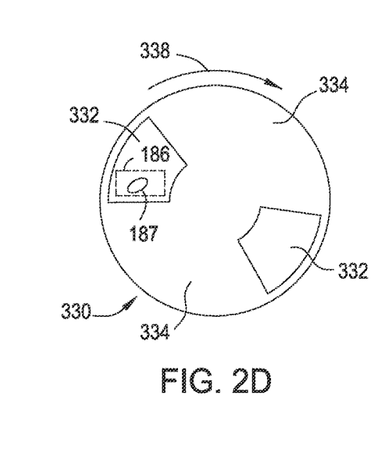
FIG. 2D is a front view depiction of a shutter, wherein the shutter has a 25% duty cycle, and wherein a 100% transmissive region of the shutter wheel is aligned with a path of light from the projector.
Figure 2E:
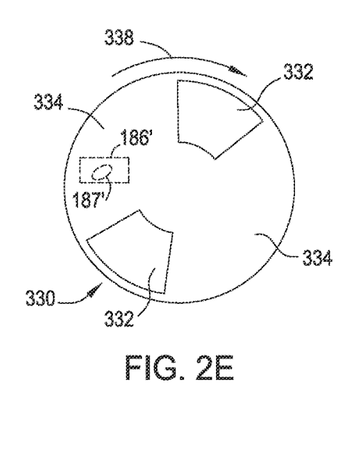
FIG. 2E is a front view of the shutter wheel of FIG. 2D, wherein a partially transmissive region of the shutter wheel is aligned with the path of light from the projector.
Figure 2F:
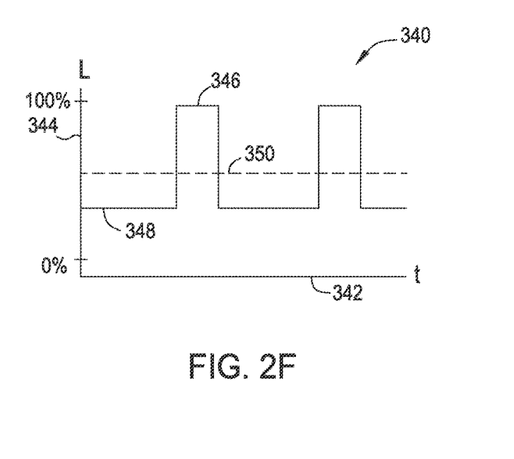
FIG. 2F is a chart illustrating luminance and perceived brightness over time of the projected image of the projector and shutter of FIG. 2D.

FIGS. 2D and 2E illustrate a shutter wheel 330 that is similar to the shutter wheel 300 shown in FIGS. 2A and 2B, except that the duty cycle has been reduced from 50% to 25%. Accordingly, the 100% transmissive regions 332 of the shutter wheel 330 are one third of the size of the partially transmissive regions 334. Referring to the chart 340 of luminance (L) 344 over time (t) 342 in FIG. 2F, the path of light 186 and moving image 187 provide 100% luminance 346 when passing through the 100% transmissive regions 332 and partial luminance 348 when some of the path of light 186' and moving image 187' pass through the partially transmissive regions 334. The resulting perceived luminance 350 may be less than the perceived luminance 320 for the shutter wheel 300 with the 50% duty cycle. However, the perceived luminance 350 may be higher than the perceived luminance 220 for the shutter wheel 200 with a 25% duty cycle and 0% transmissive regions 204.

FIGS. 2D and 2E illustrate a shutter wheel 330 in which the physical size of 100% transmissive regions 332 have been reduced (relative to the size of the 100% transmissive regions 302 shown in FIGS. 2A and 2B) to decrease the duty cycle. Referring again to FIGS. 2A and 2B, the duty cycle of the shutter wheel 300 may be reduced by varying the rotational speed of the shutter wheel 300 at different rotational positions. For example, the shutter wheel 300 may be rotated at a first speed (in the direction of arrow 308) when the 100% transmissive region is in the path of the path of light 186 and at a second speed (in the direction of arrow 308) when the partially transmissive regions 304 are in the path of the path of light 186. In instances in which the second speed is slower than the first speed, the duty cycle is effectively decreased because the partially transmissive regions 304 are in the path of the path of light 186 for longer intervals than the 100% transmissive regions 302. In instances in which the first speed is slower than the first speed, the duty cycle is effectively increased because the 100% transmissive regions 302 are in the path of the path of light 186 for longer intervals than the partially transmissive regions 304.

By controlling the degree of transmissiveness of the partially transmissive regions 304 or 334, a target perceived brightness may be achieved for a given shutter duty cycle. For example, for the shutter wheel 200 with a 25% duty cycle to have the same perceived brightness as the 50% duty cycle shutter wheel 180 with 0% transmissive regions 184, the partially transmissive regions 204 could be approximately 33% transmissive. According to the time-weighted average used herein for illustration and comparison purposes, a 25% duty cycle shutter wheel with 33% transmissive partially transmissive regions will result in a perceived luminance 350 of approximately 50% luminance.

In various instances, the partially transmissive regions of a shutter wheel may include several regions of different degrees of transmissiveness. For example, at a border between a 100% transmissive region (e.g., 100% transmissive region 302 in FIG. 2A) and a partially transmissive region (e.g., partially transmissive region 304 in FIG. 2A), the partially transmissive region may include a first region that is 75% transmissive. The center of the partially transmissive region may include a second region that is only 33% transmissive. The several regions within a partially transmissive region can include a smooth transition from one degree of transmissiveness to the next. In various aspects, the 100% transmissive regions and the partially transmissive regions can be discontinuous or not touching one another. For example, the partially transmissive regions (e.g., partially transmissive regions 304 in FIG. 2A) may be separated from 100% transmissive regions (e.g., 100% transmissive regions 302 in FIG. 2A) by a 0% transmissive region.

In various aspects, the partially transmissive regions of a shutter wheel (e.g., partially transmissive regions 304 of shutter wheel 300) can comprise a neutral density filter, meaning that all colors of light are filtered equally. In various other aspects, the partially transmissive regions of the shutter wheel can comprise an electromagnetic spectrum filter, meaning that only certain portions of the electromagnetic spectrum (e.g., colors) are filtered, thereby altering the image output by a projector. Often times, an image is prepared based on an assumed color temperature for a light source that is illuminating the image. For example, a projected image may comprise three separate copies of the same image that are precisely displayed on top of one another. A first copy of the image may be blue, a second copy may be yellow, and a third copy may be red, for example. The resulting combined image will have a certain color temperature. If the color temperature is cool, then a white region of the image may have a blue tint. Alternatively, if the color temperature is warm, then a white region of the image may have a yellow or red tint. An image for display by a projector may be prepared assuming that the color temperature of the light source for the projector is a daylight temperature of approximately 5,500-6,000 Kelvin, for example. If the color temperature of the light source is different from the assumed color temperature, then the colors of the projected image may be inaccurate. If the color temperature of the light source is not correct, then the color temperature of the light source may be adjusted by dimming one or two of the colors relative to the remaining color(s). However, such an adjustment will result in a dimmer projected image than if all three colors are displayed at maximum intensity. In various aspects, the partially transmissive regions of a shutter wheel can filter certain colors such that the colors of the image projected through the partially transmissive region are shifted. The 100% transmissive regions of the shutter wheel can project an image without shifting the colors. Again, since the shutter wheel rapidly switches between the 100% transmissive regions and the partially transmissive regions, the human eye and brain may combine the color shifted image and the image without color shifting into an image with a perceived color shift. By selecting the colors that are filtered out by the partially transmissive regions, the perceived color shift of the image can compensate for an inaccurate or incorrect color temperature of the light source.

In various aspects, the partially transmissive regions can filter visible light (visible to the human eye), allowing invisible portions of the electromagnetic spectrum (e.g., ultraviolet or infrared (IR)) to pass through. As a result, an invisible portion of the electromagnetic spectrum of the projected image can be emphasized relative to a visible portion.

In various aspects, a projector can provide digital video that includes image frames in the infrared (IR) spectrum. By providing IR spectrum images, night vision goggles can be used in a simulated environment that is projected by the projector. For example, military pilots often use night vision goggles in aircraft such as helicopters. A projector could display images of the view seen by the pilot that includes both visible image frames and IR image frames interspersed between the visible image frames.

Figure 3:
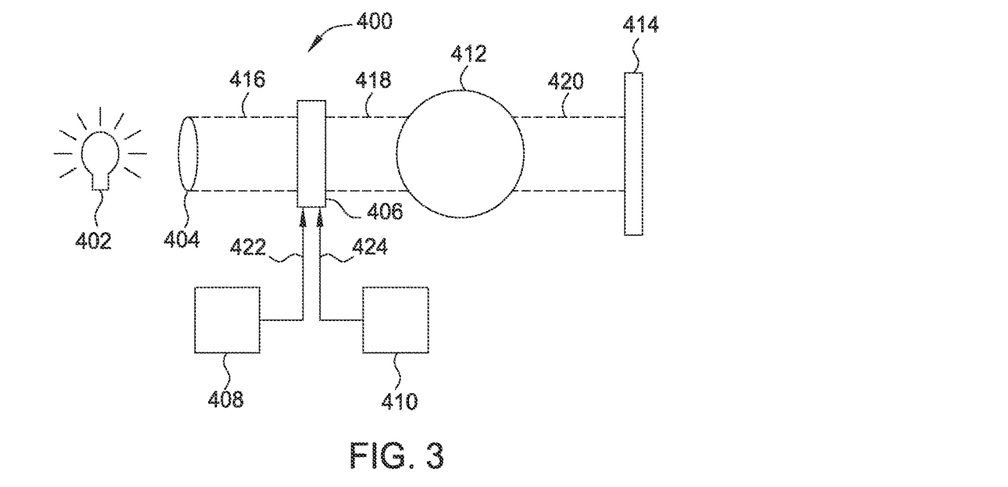
FIG. 3 is a schematic block diagram of a projector according to various aspects that outputs alternating visible and infrared (IR) images.

FIG. 3 is a schematic diagram of a projector 400 that alternately outputs digital video that includes visible light image frames and IR light image frames. The projector 400 includes a light source 402, such as an arc lamp. The light source 402 outputs visible light and light at wavelengths in the near IR portion of the electromagnetic spectrum. In various aspects, the light source 402 could include two light sources: a visible light source and an infrared light source. The projector 400 also includes optics 404, such as lenses and/or beam steering elements, that focus and direct light from the light source 402. The projector 400 also includes a modulator 406 that forms an image in a path of light 416 from the light source. The modulator 406 could include an LCD chip, and LCos chip, a DLP chip, or the like. The path of light 418 from the modulator 406 passes through a shutter 412 before being output as a path of light 420 that impinges on a viewing surface 414. The particular arrangement of the components of the projector 400 may be different from that shown in FIG. 3. For example, the shutter 412 could be arranged between the light source 402 and the modulator 406. Also, the optics could be arranged in different places in the projector.

The modulator 406 can receive visible light image signals 422 from a visible light image generator 408 and IR light image signals 424 from an IR light image generator 410. In various aspects, the visible light image generator 408 and the IR light image generator 410 are separate systems that are connected to the projector 400. In various other aspects, the visible light image generator 408 and the IR light image generator 410 could be integral with the projector 400. The modulator 406, visible light image generator 408, and IR light image generator, together, make up an imaging circuit 426 for the projector 400. The modulator 406 modifies the path of light 416 impinging on the modulator 406 to output a path of light 418 that includes video frames. A first video frame includes an image intended to be displayed in visible light and a second video frame includes an image intended to be displayed in IR light. However, the path of light 418 from the modulator 406 includes both visible light and IR light. These different wavelengths are separated from each other by the shutter 412. To this end, the shutter 412 is provisioned with regions that remove from the path of light 418 IR light from the video frames that are intended to be displayed in visible light and visible light from the video frames that are intended to be displayed in IR light. The path of light 420 output from the shutter 412 includes alternating intervals of visible light (in which the IR light has been removed by the shutter 412) and IR light (in which the visible light has been removed by the shutter 412). The switch between visible light and IR light is fast enough (e.g., sixty visible light video frames and sixty IR light video frames per second) that the human eye does not perceive any transitions.

Figure 4:
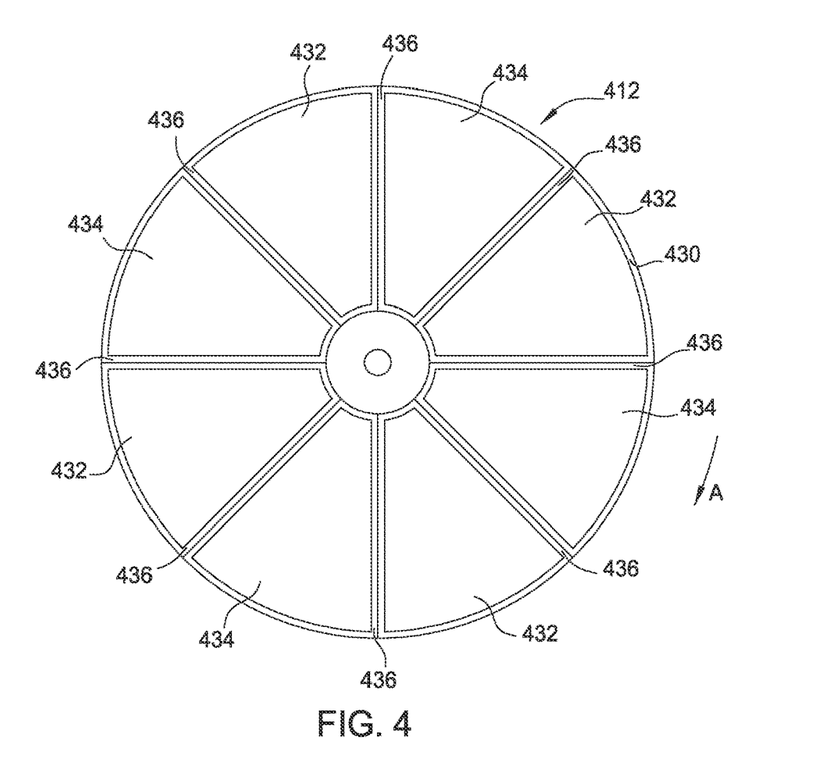
FIG. 4 is a front view of a shutter wheel according to one aspect for use with a projector that outputs alternating visible and IR images.

FIG. 4 is a front view of the shutter 412. The shutter can include a substrate 430 arranged as a disk. The substrate 430 could be optically clear glass in certain aspects. The substrate 430 includes a plurality of first regions 432 arranged thereon. The first regions 432 filter out all or substantially all of the IR light that is included in the path of light 418 impinging on the shutter 412. As a result, only light in the visible portion of the spectrum in the path of light 418 passes through the first regions 432 of the shutter 412. The substrate 430 also includes a plurality of second regions 434 arranged thereon. The second regions 434 filter out all or substantially all of the visible light that is included in the path of light 418 impinging on the shutter 412. As a result, only light in the IR portion of the spectrum in the path of light 418 passes through the second regions 434 of the shutter 412. A second region 434 is arranged between adjacent first regions 432 on the substrate 430. The adjacent first regions 432 and second regions 434 could be arranged on the substrate 430 with gaps 436 therebetween. The gaps 436 could be regions on the substrate 430 that substantially block all visible and infrared light.

Figure 5:
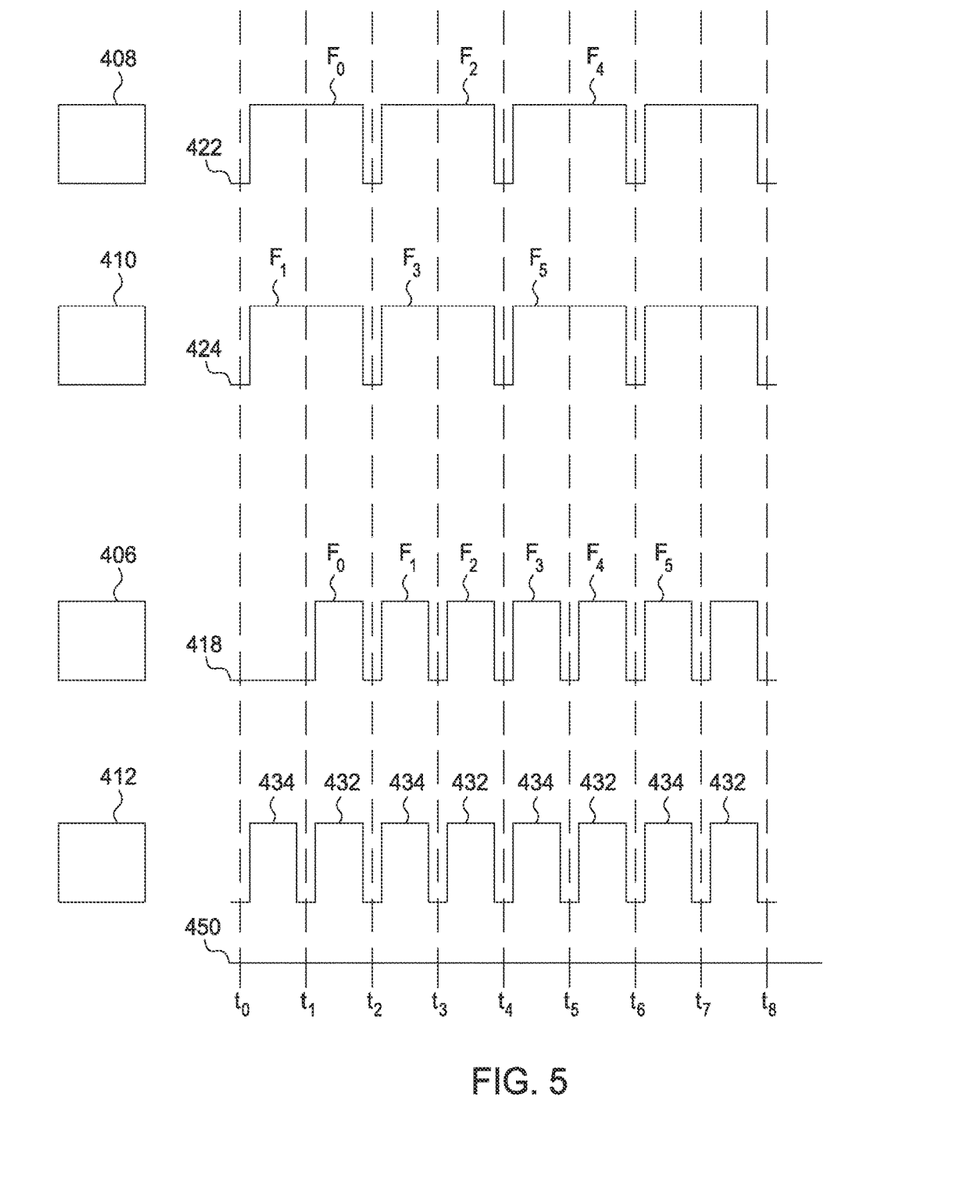
FIG. 5 is a graph that shows timing of operations for a visible light image generator, an IR light image generator, an image modulator, and the shutter of FIG. 4 for a projector that outputs alternating visible and IR images.

FIG. 5 illustrates an operating relationship between the imaging circuit 426 including the visible light image generator 408, the IR light image generator 410, the modulator 406, and the shutter 412. A timeline 450 that includes eight equal-length time intervals is shown. The timeline 450 includes a first time interval between time t0 and time t1, a second time interval between time t1 and time t2, a third time interval between time t2 and time t3, a fourth time interval between time t3 and time t4, a fifth time interval between time t4 and time t5, a sixth time interval between time t5 and time t6, a seventh time interval between time t6 and time t7, and an eighth time interval between time t7 and time t8.

FIG. 5 shows the visible light image signal 422 from the visible light image generator 408 outputting three video frames F0, F2, and F4 (and additional video frames thereafter). The first video frame F0 begins shortly after time t0 and ends shortly before time t2. Similarly, the second video frame F2 begins shortly after time t2 and ends shortly before time t4 and the third video frame F4 begins shortly after time t4 and ends shortly before time t6. Thus, each of the output video frames in the visible light image signal 422 is slightly shorter then two time intervals.

FIG. 5 also shows the IR light image signal 424 from the IR light image generator 410 outputting three video frames F1, F3, and F5 (and additional video frames thereafter). The first video frame F1 begins shortly after time t0 and ends shortly before time t2. Similarly, the second video frame F3 begins shortly after time t2 and ends shortly before time t4 and the third video frame F5 begins shortly after time t4 and ends shortly before time t6. Thus, each of the output video frames in the IR light image signal 424 is slightly shorter then two time intervals.

The visible light image signal 422 and the IR light image signal 424 send video frames to the modulator 406 at substantially the same time. Put differently, with reference to FIG. 5, the first frame F0 of the visible light image signal 422 and the first frame F1 of the IR light image signal 424 are generated and sent to the modulator 406 at substantially the same time (between time t0 and time t2).

The modulator 406 could include a buffer or the like that can temporarily store the video frames F0, F1, F2, F3, and so on, prior to the modulator 406 outputting the image information contained in the video frames. For example, in FIG. 5, the modulator 406 does not output an image from one of the video frames in the time interval between time t0 and time t1. Then, during the time interval from time t1 to time t2, the modulator 406 outputs the image contained in the first video frame F0 associated with the visible light image signal 422. Then, during the time interval between time t2 to time t3, the modulator 406 outputs the image contained in the first video frame F1 associated with the IR light imaging 422. Continuing, the modulator 406 next outputs the image contained in the second video frame F2 associated with the visible light image signal 422 and then outputs the image contained in the second video frame F3 associated with the IR light image signal 424. Thereafter, the modulator 406 outputs the image contained in the third video frame F4 associated with the visible light image signal 422 and then outputs the image contained in the third video frame F5 associated with the IR light image signal 424.

Figure 6:
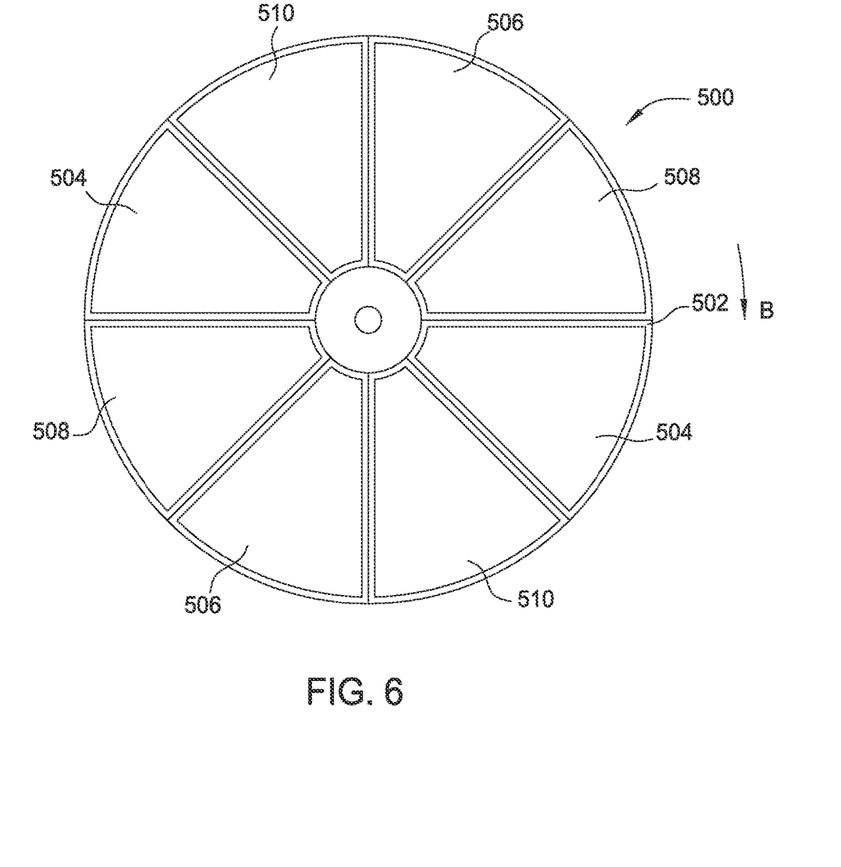
FIG. 6 is a front view of a shutter wheel according to one aspect for use with a projector that outputs alternating visible and IR images.
Figure 7:
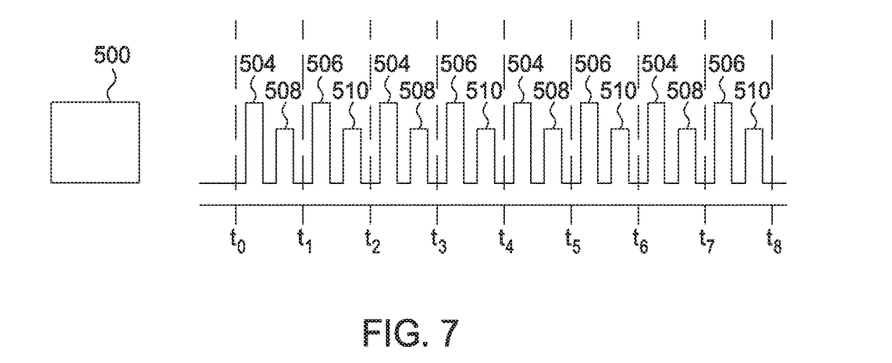
FIG. 7 is a graph that shows timing of shutter regions for the shutter of FIG. 6.

As can be readily understood from the above example in FIG. 6, the modulator 406 can operate at a frequency that is twice that of the image generators 408 and 410 in various aspects. For example, the image generators 408 and 410 may generate visible light and IR light video frames, respectively, every 60th of a second (at a rate of 60 Hz). For example, a time interval between time t0 and time t2 could be 1/60 of a second. The modulator 406 is forming images at twice the rate of the image generators (at a rate of 120 Hz). For example, the modulator 406 generates the first visible light image video frame F0 during the time interval between time t1 and time t2 (1/120 of a second) and then displays the first IR light video frame F1 during the time interval between time t2 in time t3 (1/120 of a second).

The shutter 412 operates in synchronization with the modulator 406 of the imaging circuit. For example, when the modulator 406 outputs the first visible light image video frame F0 between time t1 and time t2, the shutter 412 has rotated to a position in which a first region 432, which filters out IR light, is in the path of light 418 from the modulator 406. Then, when the modulator outputs the first IR light video image frame F1 between time t2 and time t3, the shutter 412 has rotated to a position in which a second region 434, which filters out visible light, is in the path of light 418 from the modulator 406. Then, when the modulator 406 outputs the second visible light image video frame F2 between time t3 and time t4, the shutter 412 has rotated to a position in which a first region 432 is in the path of light 418 from the modulator 406. Then, when the modulator outputs the second IR light video image frame F3 between time t4 and time t5, the shutter 412 has rotated to a position in which a second region 434 is in the path of light 418 from the modulator 406. Then, when the modulator 406 outputs the third visible light image video frame F4 between time t5 and time t6, the shutter 412 has rotated to a position in which a first region 432 is in the path of light 418 from the modulator 406. Then, when the modulator outputs the third IR light video image frame F5 between time t6 and time t7, the shutter 412 has rotated to a position in which a second region 434 is in the path of light 418 from the modulator 406.

In various aspects, a shutter wheel can be used to present a visible light image and an IR image while also reducing motion blur (as discussed above with reference to FIGS. 2A-2F). FIG. 6 illustrates an aspect of a shutter wheel 500 that includes a substrate 500 with a plurality of first regions 504, second regions 506, third regions 508, and fourth regions 510 arranged thereon. The first regions 504 filter out IR light and the second regions 506 filter out visible light. The third regions 508 and the fourth regions 510 partially filter out the visible light and the IR light. Alternatively, the third regions 508 filter out the IR light and partially filter out the visible light while the fourth regions 510 filter out the visible light and partially filter out the IR light. The shutter wheel 500 can be rotated in the direction of arrow B at a speed such that a first region 504 and a third region 508 or a second region 506 and a fourth region 510 are in the path of light 418 during a time interval. For example, if the image circuit (e.g., the modulator 406, the visible light image generator 408, and the IR light image generator 410) is generating infrared images at a particular rate, then rotation speed of the shutter wheel 500 would be double the rotation speed of the shutter wheel 412 shown in FIG. 4. For example, during the time interval between time t0 and time t1, the shutter wheel 500 rotates to position a first region 504 and then a third region 508 in the path of light 418. The first region 504 filters out the IR light from the path of light 418 impinging on the shutter. The first region 504 is in the path of light 418 for a shorter portion of the time interval than the first region 432 of the shutter 412 shown in FIG. 5 to reduce motion blurring (as discussed above with reference to FIGS. 2A-2F) of the visible light image. The third region 508 is in the path of light 418 for another portion of the time interval between time t0 and time t1. The third region 508 lets some, but not all, of the visible light through the shutter 500. As discussed above, this partial filtering may improve the perceived brightness of the image projected on the screen 414 with only a small increase to the amount of perceived motion blurring. During the next time interval between time t1 and time t2, the shutter is rotated to position a second region 506 and a fourth region 510 in the path of light 418. The second region 506 is in the path of light 418 for a shorter portion of the time interval than the second region 434 of the shutter 412 shown in FIG. 4 to reduce motion blurring of the IR image. The fourth region 510 is in the path of light 418 for another portion of the time interval between time t1 and time t2. The fourth region 510 lets some but not all of the IR light through the shutter 500 to increase the perceived brightness of the IR image.

In various circumstances, night vision goggles may be able to amplify the IR image to an extent that a lower IR image brightness on the display screen 414 may be possible. In such circumstances, the fourth regions 510 discussed above could completely block all visible light and IR light. The fourth regions 510 could also be in the path of light 418 for a longer portion of the time interval relative to the second regions 506.

Similar to the aspects discussed above, the size(s) of the first regions 504 and the second regions 506 relative to size(s) the third regions 508 and the fourth regions 510 can vary to achieve a suitable image brightness and a suitable amount of motion blurring. For example, in certain aspects, the first regions 504, second regions 506, third regions 508, and the fourth regions 510 could all be the same size. In certain aspects, the first regions 504 and the second regions 506 could be smaller than the third regions 508 and/or the fourth regions 510.

Figure 8:
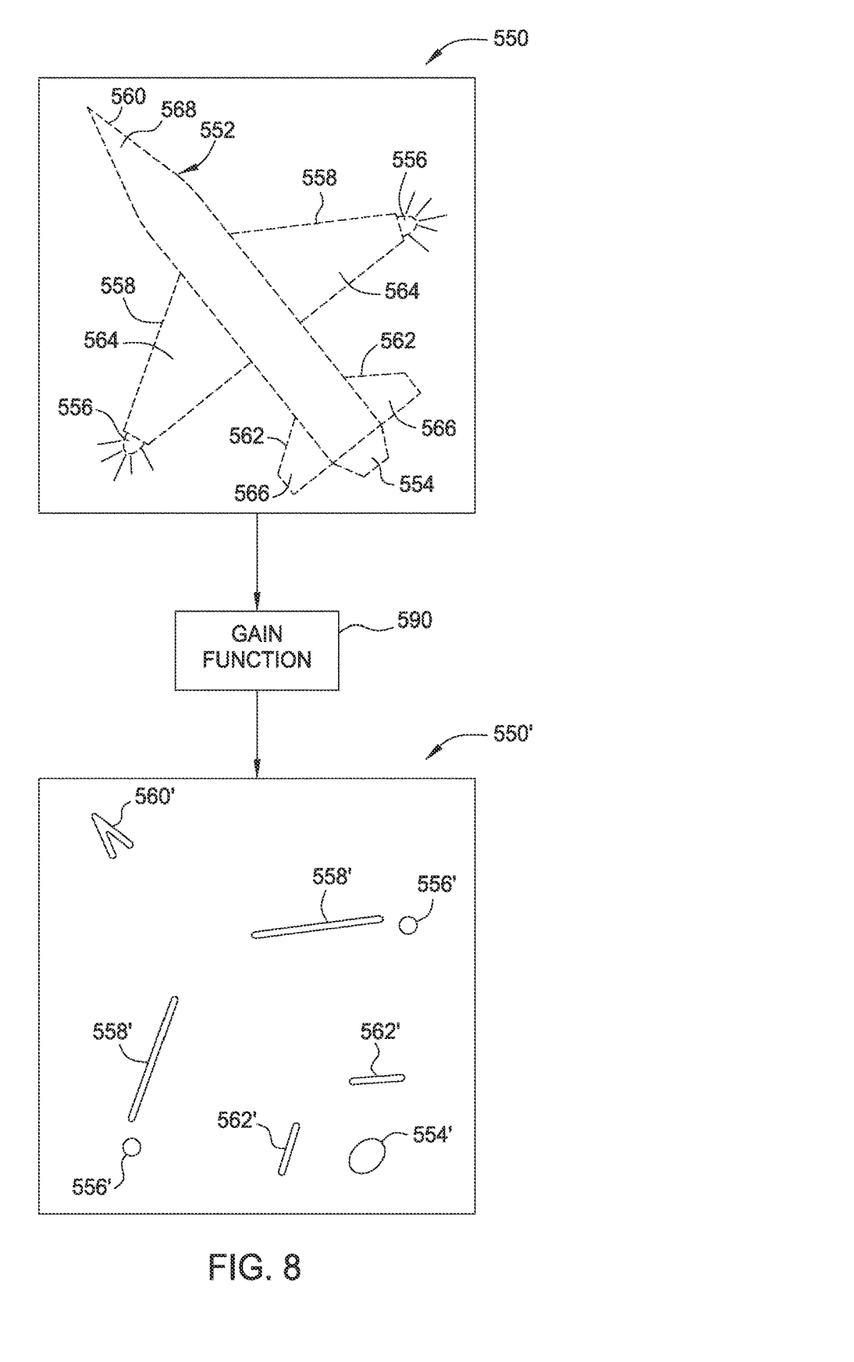
FIG. 8 is a block diagram illustrating a gain function being applied to a visible light image to simulate an IR light image.

In various aspects, an IR image could be generated using a single image generator that creates an IR light image frame by applying a gain factor to a visible light image. FIG. 8 depicts a visible light image 550 of an aircraft 552 in flight. In the scenario depicted in the visible light image 550, the aircraft 552 is flying at night, so the aircraft 552 is only dimly visible (as indicated by the dashed lines). A video projector could create simulated IR images from the visible light image 550 by applying a gain function 590 to the visible light image 550. For example, certain aspects of the visible light image 550 could include light in the IR range. For example, the depicted aircraft 552 includes beacon lights 556 on the ends of the wings 564 that emit light in the visible and IR portions of the electromagnetic spectrum. Other portions of the aircraft may be warm or hot. For example, the engine exhaust nozzle 554 may be hot from exhaust gasses. Also, the nose 560, leading edges 558 of the wings 564 and the leading edges 562 of the horizontal stabilizers 566 may be warm or hot due to air friction. The warm and/or hot areas 560, 558, 562, and 554 may be emitting low intensity light (not necessarily visible to the human eye) at the red end of the spectrum where the visible light spectrum and the IR spectrum intersect. The gain function 590 could amplify wavelengths of light in the visible spectrum toward the IR spectrum. Additionally, light in the visible spectrum away from the IR spectrum could be attenuated. FIG. 8 illustrates an IR image 550' generated by applying the gain function 590 to the visible light image 550. The IR image 550' includes an outline of the nose 560' of the aircraft 552, outlines of the leading edges 558' of the wings 564, outlines of the leading edges 562' of the horizontal stabilizers, an outline of the engine exhaust nozzle 554', and IR signatures 556' from the beacon lights. The IR frame 550' can be sent by the image generator to the modulator.

As discussed above, in various aspects, the light source 402 for the projector 400 could include two light sources: a visible light source and an infrared light source. In certain aspects, both the visible light source and the infrared light source could be active at the same time (e.g., always on) and the shutter 412 or the shutter 500 could selectively block the visible light or the infrared light depending on the image being displayed by the modulator 406. In certain other aspects, the visible light source and the infrared light source could be selectively activated and deactivated or dimmed. For example, during a period of time when the modulator 406 displays a visible light image, the visible light source could be energized (i.e., illuminated) and the infrared light source could be de-energized. During a period of time when the modulator 406 displays an infrared image, the infrared light source could be energized and the visible light source could be de-energized or dimmed. In such certain other aspects, the shutter 412 or the shutter 500 could omitted.

The above-described video projection that alternately displays visible light images and IR light images can be used in a simulator environment to allow users to practice various tasks using night vision goggles. The IR light images can trigger the sensors in the night vision goggles such that the goggles detect an image.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects of the present invention, other and further aspects of the invention may be devised without departing from the basic scope thereof, and the scope thereof is determined by the claims that follow.

What is claimed is:

1. A video projector, comprising:
    a light source operable to output visible light and near infrared (IR) light;
    an imaging circuit arranged in a path of light from the light source, wherein the imaging circuit is operable to alternatingly output a visible light image during a first period of time and an IR light image during a second period of time after the first period of time;
    a shutter arranged relative to the path of light to receive the visible light image and the IR light image, wherein the shutter includes a first region and a second region, wherein the first region is transmissive to visible light and non-transmissive to IR light, wherein the second region is transmissive to IR light and non-transmissive to visible light; and
    a controller communicatively coupled to the shutter and configured to sequentially position the first region and then the second region in the path of light, and wherein operation of the shutter is syncronized with operation of the imaging circuit based on whether the light source is outputting visible light or near IR light such that the first region is in the path of light during the first period of time and the second region is in the path of light during the second period of time.

2. The video projector of claim 1, wherein the shutter comprises a rotatable disk, wherein the rotatable disk comprises a plurality of first regions and a plurality of second regions, wherein the plurality of first regions are spaced around the rotatable disk, and wherein a second region of the plurality of second regions is arranged between adjacent first regions.

3. The video projector of claim 2, wherein the rotatable disk comprises a plurality of third regions, wherein a third region of the plurality of third regions is arranged between adjacent first regions and second regions.

4. The video projector of claim 3, wherein each third region of the plurality of third regions is partially transmissive to at least one of visible light and IR light.

5. The video projector of claim 3, wherein each third region of the plurality of third regions is non-transmissive to visible light and IR light.

6. The video projector of claim 3, wherein the rotatable disk comprises a plurality of fourth regions, wherein a fourth region of the plurality of fourth regions is arranged between adjacent first regions and second regions, and wherein a first region, a third region, a second region, and a fourth region are selectively positioned in the path of light during a time interval, and wherein the first region and the second region are positioned in the path of light for shorter portions of the time interval than the third region and the fourth region.

7. The video projector of claim 3, wherein the rotatable disk comprises a plurality of fourth regions, wherein a fourth region of the plurality of fourth regions is arranged between adjacent first regions and second regions, and wherein a first region, a third region, a second region, and a fourth region are selectively positioned in the path of light during a time interval, and wherein the first region, the second region, the third regions, and the fourth region are positioned in the path of light for equal portions of the time interval.

8. The video projector of claim 1, wherein the imaging circuit includes:
 a visible light image generator operable to output a visible light image signal;
 an IR light image generator operable to output an IR light image signal; and
 a modulator in communication with the visible light image generator to receive the visible light image signal and in communication with the IR light image generator to receive the IR image signal, wherein the modulator is operable to output the visible light image based on the visible light image signal, and wherein the modulator is operable to output the IR light image based on the IR light image signal.

9. The video projector of claim 1, wherein the imaging circuit includes:
 an image generator operable to output a visible light image signal and an IR light image signal, wherein the image generator outputs the IR light image signal by modifying a particular visible light image signal by applying a gain function to the particular visible light image signal and outputting the modified particular visible light image signal as the IR light image signal; and
 a modulator in communication with the image generator to receive the visible light image signal and the IR light image signal, wherein the modulator is operable to output the visible light image based on the visible light image signal, and wherein the modulator is operable to output the IR light image based on the IR light image signal.

10. A shutter for a video projector, comprising:
 a rotatable disk, wherein the rotatable disk comprises a plurality of first regions and a plurality of second regions, wherein the plurality of first regions are spaced around the rotatable disk, and wherein a second region of the plurality of second regions is arranged between adjacent first portions, wherein the first region is transmissive to visible light and is non-transmissive to near infrared (IR) light, and wherein the second region is transmissive to IR light and is non-transmissive to visible light,
 wherein the rotatable disk comprises a plurality of third regions and a plurality of of fourth regions, wherein each third region of the plurality of third regions and each fourth region of the plurality of fourth regions is arranged between respective pairs of first regions and second regions, wherein each third region of the plurality of third regions and each fourth region of the plurality of fourth regions at least partially filter both visible light and IR light.

11. The shutter of claim 10, wherein the plurality of third regions are partially transmissive to at least one of visible light and IR light.

12. The shutter of claim 10, wherein the plurality of third regions are non-transmissive to visible light and IR light.

13. The shutter of claim 10, wherein a first region of the plurality of first regions, a second region of the plurality of second regions, and a third region of the plurality of third regions are selectively positioned in a path of light during a time interval, and wherein the first region and the second region are positioned in the path of light for shorter portions of the time interval than the third region.

14. The shutter of claim 10, wherein a first region of the plurality of first regions, a second region of the plurality of second regions, and a third region of the plurality of third regions are selectively positioned in a path of light during a time interval, and wherein the first region, the second region, and the third region are positioned in the path of light for equal portions of the time interval.

15. The shutter of claim 10, wherein the rotatable disk comprises a glass substrate, wherein each first region of the plurality of first regions comprises a long pass IR filter applied to the glass substrate, and wherein each second region of the plurality of second regions comprises a visible light filter applied to the glass substrate.

16. A method for projecting a video image, the method comprising:
 projecting, to a filter from an imaging circuit configured to project a path of light that includes light in the visible spectrum and light in the near infrared (IR) spectrum, a visible light image during a first time interval;
 filtering, at the filter during the first time interval, light in the near IR spectrum from the path of light received from the imaging circuit;
 projecting, to the filter from the imaging circuit, an IR image during a second time interval; and
 filtering, at the filter during the second time interval, light in the visible spectrum from the path of light received from the imaging circuit.

17. The method of claim 16, further comprising:
 for a portion of the first time interval, at least partially filtering light in the visible light spectrum from the path of light; and
 for a portion of the second time interval, at least partially filtering light in the IR spectrum from the path of light.

18. The method of claim 17, wherein the portion of the first time interval comprises 25% of the first time interval, and wherein the portion of the second time interval comprises 25% of the second time interval.

19. The method of claim 17, wherein the portion of the first time interval comprises 50% of the first time interval, and wherein the portion of the second time interval comprises 50% of the second time interval.

* * * * *

UNITED STATES PATENT AND TRADEMARK OFFICE
CERTIFICATE OF CORRECTION

PATENT NO. : 10,389,988 B2
APPLICATION NO. : 14/818061
DATED : August 20, 2019
INVENTOR(S) : Harold R. Streid et al.

Page 1 of 1

It is certified that error appears in the above-identified patent and that said Letters Patent is hereby corrected as shown below:

In Column 14, Line 43, in Claim 1, delete "syncronized" and insert -- synchronized --, therefor.

In Column 15, Line 15, in Claim 7, delete "regions," and insert -- region, --, therefor.

In Column 15, Line 60, in Claim 10, delete "of of" and insert -- of --, therefor.

Signed and Sealed this
Twenty-ninth Day of October, 2019

Andrei Iancu
*Director of the United States Patent and Trademark Office*